US006428867B1

(12) United States Patent
Scott et al.

(10) Patent No.: US 6,428,867 B1
(45) Date of Patent: *Aug. 6, 2002

(54) RESEALABLE TAMPER INDICATING LABEL FLAP INCLUDING PRINTER INDICIA

(75) Inventors: Barry M. Scott, West Bend; James F. Konicke, Muskego; Martin J. Leonard, Hartland, all of WI (US)

(73) Assignee: Prime Label & Screen, Inc., Pewaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,683

(22) Filed: Dec. 14, 1999

(51) Int. Cl.[7] ............................................. B65D 75/52
(52) U.S. Cl. ................... 428/40.1; 206/807; 283/81; 283/101; 428/41.6; 428/41.7; 428/41.8; 428/41.9; 428/42.1; 428/42.2; 428/42.3; 428/43; 428/914; 428/915
(58) Field of Search .................. 428/40.1, 41.6, 428/41.7, 41.8, 41.9, 42.1, 42.2, 42.3, 43, 914, 915; 283/81, 101; 206/807

(56) References Cited

U.S. PATENT DOCUMENTS

| 4,082,873 A | 4/1978 | Williams | 428/40 |
|---|---|---|---|
| 4,180,929 A | 1/1980 | Schultz, Jr. | 40/2.2 |
| 4,608,288 A | 8/1986 | Spindler | 428/78 |
| 4,652,473 A | 3/1987 | Han | 428/35 |
| 4,709,397 A | 11/1987 | Voshall et al. | 383/5 |
| 4,998,666 A | 3/1991 | Ewan | 229/102 |
| 5,294,470 A | 3/1994 | Ewan | 428/40 |
| 5,449,538 A * | 9/1995 | Denny | 428/40.1 |
| 5,551,729 A | 9/1996 | Morgan | 283/94 |
| 5,582,887 A | 12/1996 | Etheredge | 428/41.5 |
| 5,658,411 A | 8/1997 | Faykish | 156/233 |
| 5,683,774 A | 11/1997 | Faykish et al. | 428/40.1 |
| 5,770,283 A | 6/1998 | Gosselin et al. | 428/35.7 |

* cited by examiner

Primary Examiner—Nasser Ahmad
(74) Attorney, Agent, or Firm—Andrus, Sceales, Starke & Sawall, LLP (57) ABSTRACT

A resealable label flap for use with a product package including a tamper indicating tab that remains in contact with the package body to indicate that the label flap has been removed from the package body. The tamper indicating tab includes a first ink layer that defines an indicia or pattern on the top surface of the tamper indicating tab. A second ink layer is applied over the entire top surface of the tamper indicating tab, including over the first ink layer. The second ink layer does not bond to the first ink layer. When the label flap is initially pulled from the product package, the tamper indicating tab separates from the remaining portions of the label flap. As the tamper indicating tab separates from the label flap, the first ink layer and the second ink layer separate from each other such that the portions of the second ink layer applied over the first ink layer remain in contact with the top layer of the label flap. The separation of the first ink layer and the second ink layer during the initial removal of the label flap indicates to a user that the label flap has been opened.

15 Claims, 4 Drawing Sheets

RESEALABLE TAMPER INDICATING LABEL FLAP INCLUDING PRINTER INDICIA

BACKGROUND OF THE INVENTION

The present invention relates to a resealable label flap positionable to cover an opening in a product package containing removable articles such that the label flap can be repeatedly removed and reapplied to access the articles contained within the package. More specifically, the present invention relates to a resealable label flap that includes a tamper evident tab having a printed indicia that separates from the remaining portions of the label flap and remains attached to the product package after the label flap is removed from the product package for the first time.

Resealable label flaps are commonly used with product packages that include packaged sheet-like removable articles that have been thoroughly wetted with a liquid prior to packaging. The product package is generally constructed from a thin, liquid impervious material that has an opening over which the label flap is removably adhered. Typically, the label flap is a strip of flexible or semi-rigid thermoplastic material having a removable pressure-sensitive adhesive applied to one surface of the label. The removable adhesive creates a generally air-tight seal around the package opening to prevent the packaged removable articles from drying out during storage.

Since resealable label flaps can be continuously removed and reapplied to the product package containing removable articles without any indication that the product package has been previously opened, a need has arisen for a resealable label flap that provides an indication that the product package has been opened and subsequently resealed. Particularly, a need exists for such a tamper evident resealable label flap in the medical field, since once the product package has been opened, the contents of the product package may no longer be sterile.

Therefore, it is an object of the present invention to provide a resealable label flap that includes means for indicating whether the label flap has previously been removed from the product package. It is an additional object of the invention to provide a resealable label flap that includes a tamper indicating tab formed on the label flap that separates from the label flap and remains attached to the product package when the label flap is initially removed from the package. It is a further object of the invention to provide a discontinuous first ink layer on the tamper indicating tab that defines an indicia and a second ink layer that covers the first ink layer such that the indicia is not visible when the label flap is initially applied to the product package. It is a further object of the present invention to provide the second ink layer that has desired adhesive properties such that the second ink layer adheres to the top layer of the label flap and separates from the first ink layer when the label flap is initially removed from the product package, thereby allowing the indicia created by the first ink layer to be visible when the label flap is removed. It is a further object of the present invention to position the tamper indicating tab on a starting tab formed on the label flap such that the tamper indicating tab separates from the label flap prior to the label flap being pulled past the opening in the product package. Additionally, it is an object of the present invention to provide an easily constructed, and easily printed tamper evident resealable label flap that can be used in connection with a product package to accurately indicate whether the product package has been previously opened.

SUMMARY OF THE INVENTION

The present invention is a resealable label flap that can be positioned to cover an opening in a product package. The resealable label flap includes a main body portion extending between a first end and a second end. The main body portion includes a generally smooth top surface and a bottom surface including a layer of a first adhesive. The first adhesive is applied over the entire bottom surface of the main body portion and is a removable pressure-sensitive adhesive that retains its adhesive properties following repeated removal and reapplication of the main body portion to the package body.

The label flap further includes a starting tab integrally formed with the main body portion and positioned adjacent to one end of the main body portion. The first adhesive is rendered ineffective on the starting tab such that the starting tab does not adhere to the top surface of the package body when the label flap is applied to the product package.

The label flap is a two layer construction consisting of a base layer and a transparent top layer adhesively attached to the base layer. Prior to attachment of the transparent top layer to the base layer, a tamper indicating tab is formed in the base layer. The tamper indicating tab is defined by a weakened portion of the base layer such that the tamper indicating tab can be separated from the remaining portions of the base layer. In the preferred embodiment of the invention, the tamper indicating tab is a die cut shape formed as part of the starting tab.

The tamper indicating tab includes the first adhesive applied to its bottom surface. When the label flap is applied to the package body, the layer of first adhesive applied to the bottom surface of the tamper indicating tab forms an adhesive bond between the tamper indicating tab and the top surface of the package body. The adhesive bond between the first adhesive on the bottom surface of the tamper indicating tab and the top surface of the package body is stronger than the strength of the weakened area of the base layer defining the tamper indicating tab such that when the label flap is initially removed from the package body, the tamper indicating tab separates from the remaining portions of the starting tab.

Prior to the tamper indicating tab being formed in the base layer, a first ink layer is printed to the top surface of the base layer in the area that will form the tamper indicating tab. The first ink layer is a discontinuous layer of ink that defines an indicia on the top surface of the tamper indicating tab. The first ink layer forms a chemical bond to the top surface of the tamper indicating tab. Preferably, the first ink layer is of a light color and defines the indicia on the tamper indicating tab.

After the first ink layer has been applied, a second ink layer is applied over the entire tamper indicating tab, including the portion of the tamper indicating tab including the first ink layer. The second ink layer bonds to the top surface of the tamper indicating tab in the areas not covered by the first ink layer. The second ink layer is selected such that the second ink layer does not bond to the first ink layer in the areas in which the second ink layer is applied over the top of the first ink layer. In the preferred embodiment of the invention, the second ink layer is a dark color, such that the first ink layer is not visible through the second ink layer when viewed from above.

After the second ink layer has been applied over the tamper indicating tab, the tamper indicating tab is die cut and the transparent top layer is adhesively attached to the entire base layer, including the portion of the base layer upon which the first ink layer and the second ink layer were previously printed. After the top layer has been applied to the base layer, the entire label flap can be applied to the product package.

Once the label flap has been applied to the product package, the label flap can be removed by the user to access the disposable articles contained within the product package. As the label flap is pulled from the product package for the first time, the tamper indicating tab separates from the remaining portions of the label flap due to the adhesive bond created between the first adhesive contained on the bottom surface of the tamper indicating tab and the top surface of the product package. As the tamper indicating tab separates from the label flap, the first ink layer remains on the tamper indicating tab due to the chemical bond between the first ink layer and the tamper indicating tab. At the same time, the areas of the second ink layer printed directly onto the tamper indicating tab between the first ink layer also remain attached to the tamper indicating tab.

The types of ink used for the first ink layer and the second ink layer are specifically selected such that as the tamper indicating tab separates from the label flap, the areas of the second ink layer printed on the first ink layer separate from the first ink layer and remain attached to the top layer of the label flap. Specifically, the second ink layer is selected such that the second ink layer creates a stronger bond to the top layer of the label flap than the bond between the first ink layer and the second ink layer. Thus, once the label flap has been initially removed from the product package, the indicia defined by the first ink layer remains on the tamper indicating tab while the areas of the second ink layer printed over the first ink layer separate from the first ink layer to define the negative image of the indicia on the top layer of the label flap.

Once the label flap has been removed to reveal the opening in the product package, the label flap can be reapplied to the product package to seal the opening in the product package. As the label flap is reapplied to the package body, the negative image of the indicia on the label flap no longer lines up with the positive image of the indicia contained on the tamper indicating tab. Thus, the user is able to immediately determine that the product package has been previously opened due to the misalignment between the negative and positive images created by the first and second ink layers.

The tamper indicating tab can be formed either in the starting tab of the label flap or at various positions on the label flap. Both the separation of the tamper indicating tab from the label flap and the separation between the first and second ink layers allow the user to determine whether the label flap has been previously opened to prevent tampering to the articles contained in the product package.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figures 1, 2:
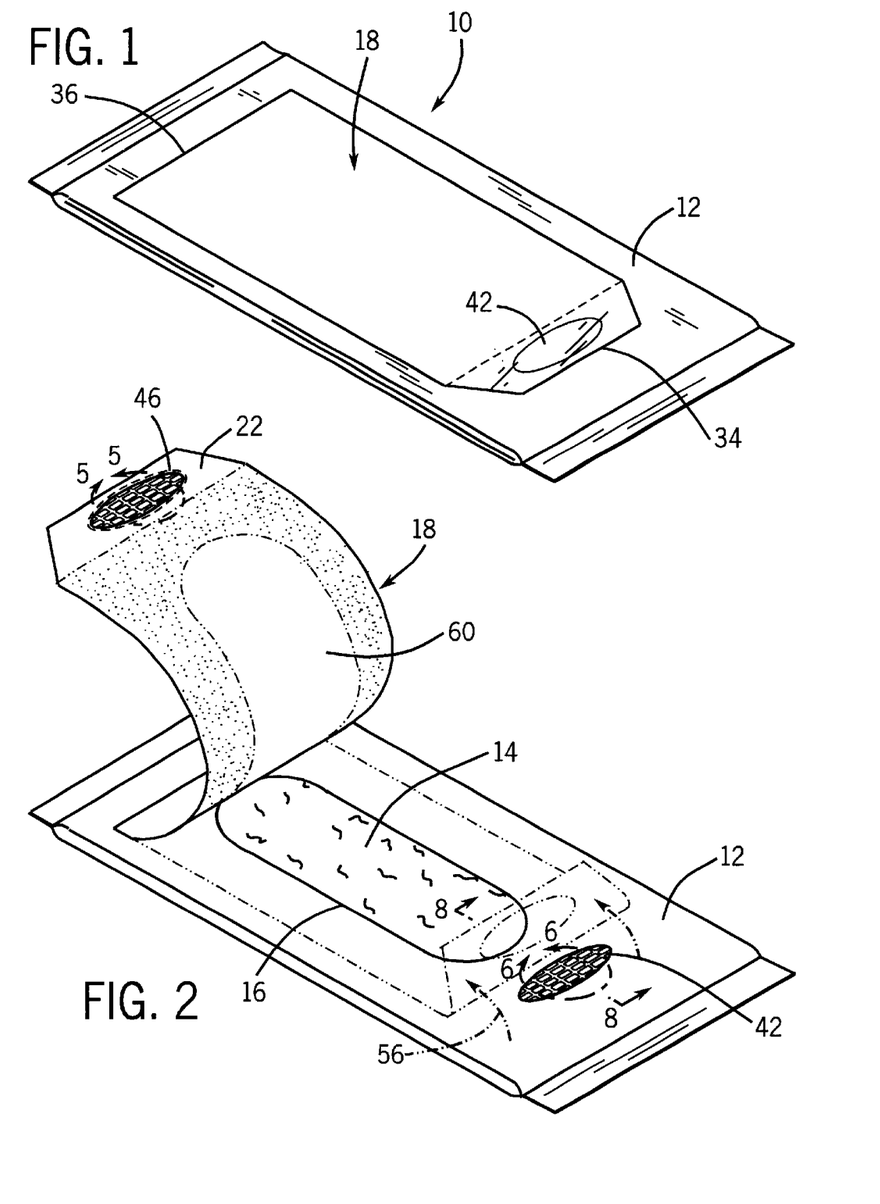
FIG. 1 is a perspective view of a product package containing removable articles, including a tamper evident resealable label flap of the present invention.
FIG. 2 is a perspective view illustrating the product package with the resealable label flap in the open position thereby permitting removal of the contained articles.

FIGS. 1 and 2 generally illustrate a resealable product package 10 having a main package body 12 formed from a cylinder of liquid-impervious, flexible thermoplastic material heat sealed on each end to define an internal space for housing the removable articles contained within the product package 10. In the embodiment of the invention illustrated in FIGS. 1 and 2, the contents of the product package 10 comprise a series of stacked, individual cleansing cloths 14 that can be impregnated with appropriate cleaning solutions. For example, the cleansing cloths 14 could be wetted baby wipes or hand towels.

The package body 12 includes an opening 16 through the package body to provide access to the internal space of the package body 12 containing the cleansing cloths 14. As can be readily understood, the individual cleansing cloths 14 can be removed from the internal space defined by the package body through the opening 16.

The product package 10 further includes a removable label flap 18 that is applied to the package body 12 to seal the package body 12 by covering the opening 16. The label flap 18 contacts the generally smooth, flat top surface of the package body 12 and forms a generally water- and air-tight seal with the package body 12 around the opening 16. The water- and air-tight seal around the opening 16 prevents contamination of the cleansing cloths 14 and prevents the cleansing cloths 14 from drying out.

The label flap 18 is resealably attached to the upper surface of the package body 12 such that the label flap 18 can be repeatedly opened and resealed to provide access to the cleansing cloths 14 contained within the internal space defined by the package body 12.

Figure 3:
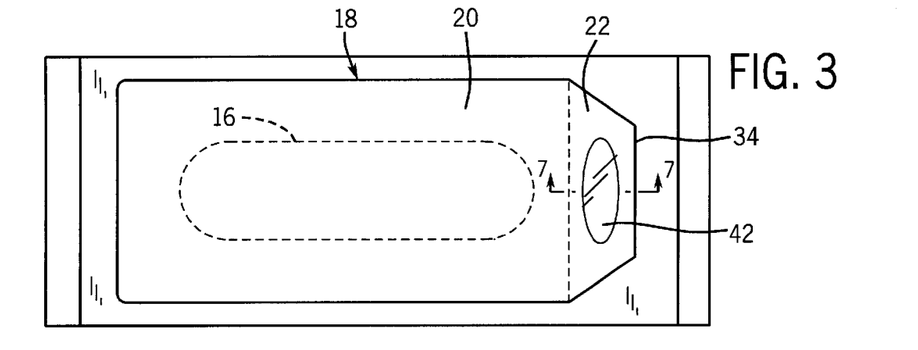
FIG. 3 is a top view of the product package including the tamper evident resealable label flap.
Figure 4:
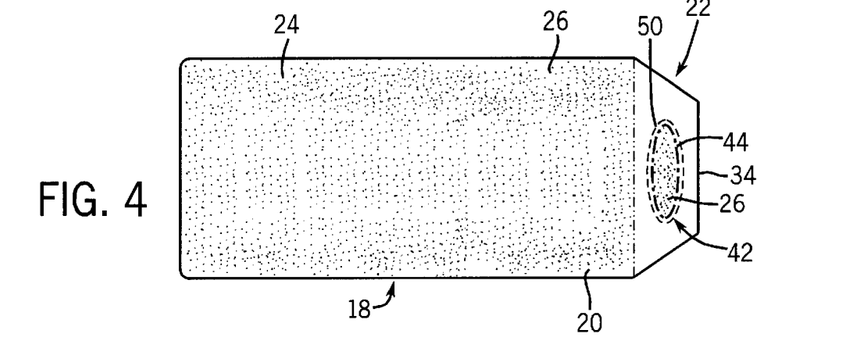
FIG. 4 is a bottom view of the tamper evident resealable label flap of the present invention.

As can be seen in FIGS. 3 and 4, the label flap 18 includes a main body portion 20 and an integrally formed starting tab 22. In general, the main body portion 20 includes a removable adhesive that allows the label flap 18 to be repeatedly peeled from the package body 12 and reapplied thereto in order to gain access to the opening 16 and then reseal the product package 10. The resealable adhesive contained on the main body portion 20 generally retains its adhesive properties during repeated application and removal of the main body portion 20 the package body 12.

The starting tab 22 is a portion of the label flap 18 in which the adhesive on the label flap 18 is rendered ineffective or, in the alternative, not present such that the starting tab 22 can be grasped by the user to pull the label flap 18 from the package body 12.

Referring now to FIG. 4, the bottom surface 24 of the main body 20 is covered by a first adhesive 26. In the preferred embodiment of the invention, the first adhesive 26 applied to the bottom surface 24 is a pressure-sensitive adhesive that retains its adhesive qualities as the label flap 18 is repeatedly peeled from the package body 12 and reapplied thereto. The first adhesive 26 has the desired adhesive properties to form a seal around the opening 16 while also being able to be pulled from the package body without damaging the thermoplastic material forming the package body 12.

In the preferred embodiment of the invention, the first adhesive 26 is a V-29 adhesive available from Flexcon, Inc. of Spencer, Mass. The first adhesive 26 is applied in a layer having a thickness of approximately 0.0007 inches.

Figure 8:
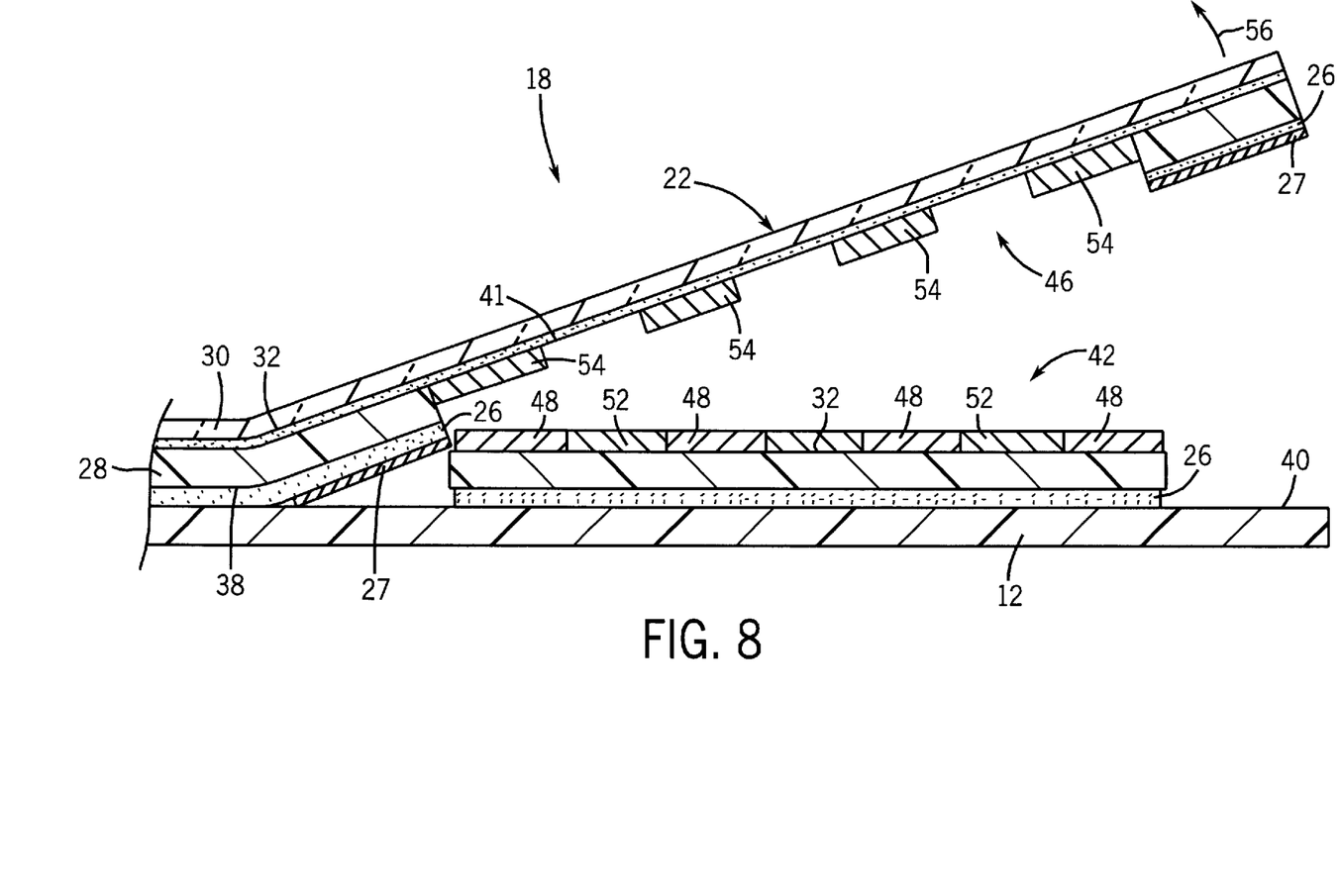
FIG. 8 is a partial section view taken along line 8—8 of FIG. 2 illustrating the portions of the first ink layer and second ink layer remaining in contact with the tamper indicating tab and the top layer of the resealable label flap.

In the embodiment of the invention shown in FIG. 8, the starting tab 22 includes a masking layer 27 applied over the first adhesive 26 to render the first adhesive 26 ineffective such that the starting tab does not adhere to the package body 12 when the label flap 18 is applied thereto, as illustrated in FIG. 1. Although the starting tab 22 is shown in the illustrated embodiment of the invention as including the masking layer 27, it is contemplated that the starting tab 22 could be devoid of the first adhesive 26. In either case, the back surface of the starting tab 22 does not adhere to the package body 12 when the label flap 18 is applied to the product package 10.

The label flap 18 is generally constructed from two individual layers of material adhesively joined to each other to define the overall thickness of the label flap 18. Specifically, as best illustrated in FIG. 8, label flap 18 includes a base layer 28 and a top layer 30 adhesively attached to the top surface 32 of the base layer 28. The base layer 28 extends between a first end 34 and a second end 36 to define the overall length of the label flap 18, as illustrated in FIG. 1. The first adhesive 26 is applied to the bottom surface 38 of the base layer 28 to releasably attach the base layer 28, and thus the label flap 18, to top surface 40 of the thermoplastic package body 12. In the preferred embodiment of the invention, base layer 28 is formed from white polyethylene having an overall thickness of 0.0038 inches. In the preferred embodiment of the invention, the base layer 28, including the first adhesive 26, is available as Product No. PE380FWM/V-29/50KQ-8 from Flexcon, Inc.

The top layer 30 includes an adhesive layer 41 such that the top layer 30 adheres to the top surface 32 of the base layer 28. The top layer 30 and adhesive layer 41 are transparent such that printing contained on the top surface 32 of the base layer 28 is visible through the transparent top layer 30. The transparent top layer 30 extends along the entire length of the label flap 18 from the first end 34 to the second end 36. In the preferred embodiment of the invention, the top layer 30 is formed from clear polypropylene having a thickness of 0.001 and including an acrylic adhesive. In the preferred embodiment of the invention, the top layer 30 including the adhesive layer 41 are available from Adhesive Coated Products of Ohio, Port Clinton, Ohio as Product No.420.

Referring now to FIGS. 3 and 4, before the top layer 30 is applied to the base layer 28, a tamper indicating tab 42 is formed in a portion of the base layer 28. In the embodiment of the invention illustrated in FIGS. 3 and 4, the tamper indicating tab 42 is formed as a portion of the starting tab 22. Specifically, the tamper indicating tab 42 is spaced from both the first end 34 of the label flap 18 and the line of separation between the starting tab 22 and the main body portion 20. The tamper indicating tab 42 is defined within the starting tab 22 by a die cut score line 44 formed in the base layer 28. The score line 44 define the tamper indicating tab 42 and decrease the strength of the base layer 28 in the area surrounding the tamper indicating tab 42. In the alterative, the tamper indicating tab 42 could be defined by a series of perforations that weaken the strength of the base layer 28.

As can best be seen in FIG. 4, the back surface of the tamper indicating tab 42 does not include the masking layer 27 and thus includes the exposed first adhesive 26. The remaining portions of the starting tab 22 include the masking layer 27, as previously discussed, to render the first adhesive 26 ineffective.

When the label flap 18 of the present invention is positioned in contact with the package body 12, as illustrated in FIG. 1, the first adhesive 26 contained on the back surface of the tamper indicating tab 42 is exposed to the top surface 40 of the package body 12. In the preferred embodiment of the invention, the material strength of the base layer 28 remaining between die cut score line 44 that defines the tamper indicating tab 42 is less than the strength of the adhesive bond created between the first adhesive 26 formed on the back surface of the tamper indicating tab 42 and the top surface of the package body 12. Thus, when the label flap 18 is initially removed from the package body 12, as illustrated in FIG. 2, the base layer 28 tears along the score line 44 defining the tamper indicating tab 42 and the tamper indicating tab 42 separates from the remaining portions of the label flap 18 and remains in contact with the top surface of the package body 12, as illustrated in FIG. 2: The presence of the tamper indicating tab 42 on the top surface 40 of the package body 12 indicates that the label flap 18 has been previously removed from the package body 12 such that the contents of the product package 10 may either have been tampered with or may no longer be sterile.

In addition to the separation of the tamper indicating tab 42 from the label flap 18, the resealable label flap 18 of the present invention includes an additional feature that allows the user to determine whether the label flap 18 has previously been removed from the product package 10. As can be seen in FIG. 2, the top surface of the tamper indicating tab 42 includes a printed indicia while the bottom surface of the top layer 30 of the label flap 18 includes a negative image of the printed indicia contained on the tamper indicating tab 42.

When the label flap 18 is initially applied to the product package 10, as illustrated in FIG. 1, the area of the label flap 18 defining the tamper indicating tab 42 includes a generally solid color printed image. When the label flap 18 is removed for the first time, as illustrated in FIG. 2, the tamper indicating tab 42 separates from the label flap 18 and includes the positive image of the printed indicia, while the negative image of the printed indicia remains on the label flap 18. When the label flap 18 is reapplied to the package body 12, the negative image of the indicia remaining on the label flap 18 will no longer line up with the positive image of the indicia contained on the tamper indicating tab 42 due to the slight misalignment that will occur between the tamper indicating tab 42 and the void 46 formed in the base layer 28 of label flap 18 where the tamper indicating tab 42 previously existed. Thus, when the label flap 18 is reapplied to the package body 12, the misalignment between the tamper indicating tab 42 and the void 46 blurs the previously solid color image formed by the positive and negative images of the indicia, which indicates to a user that the product package 10 has been previously opened.

Figure 6:
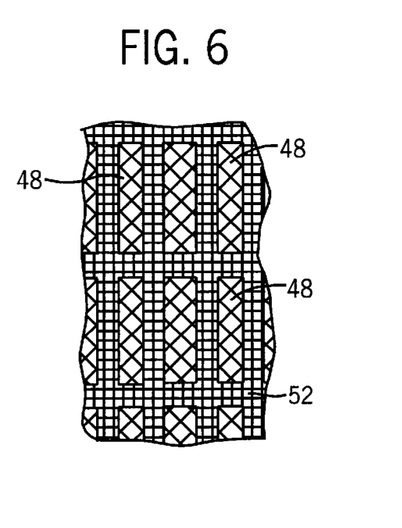
FIG. 6 is an enlarged view taken along line 6—6 of FIG. 2 illustrating the portions of the first ink layer and the second ink layer on the tamper indicating tab that remains in contact with the product package after removal of the label flap.
Figure 7:
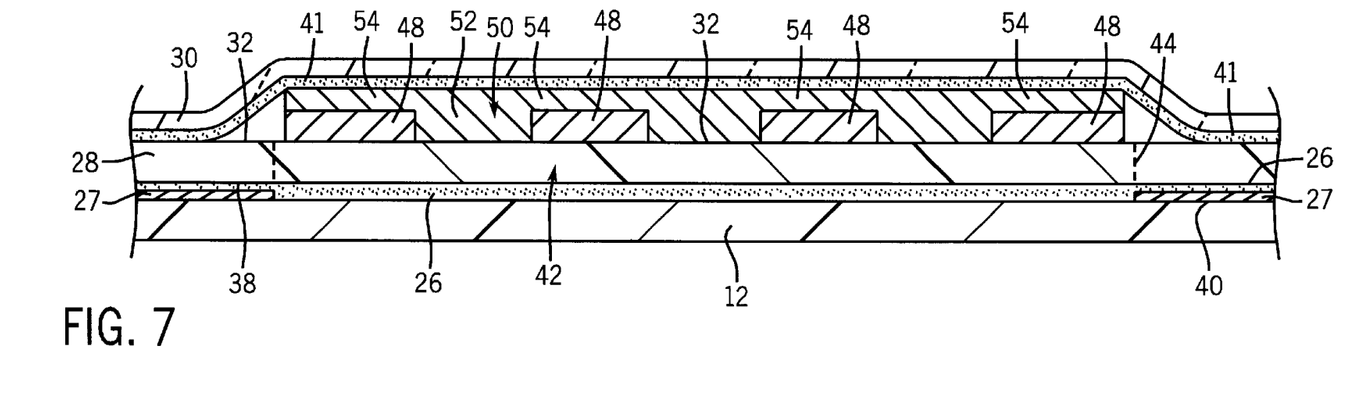
FIG. 7 is a partial section view taken along line 7—7 of FIG. 3 illustrating the label flap as attached to the product package.

Referring now to FIG. 7, the indicia contained on the tamper indicating tab 42 is formed as follows. Initially, a discontinuous first ink layer 48 is applied to the top surface 32 of the base layer 28 in the area of the base layer 28 that will include the tamper indicating tab 42. The first ink layer 48 is printed on the top surface 32 of the tamper indicating tab 42 in a pattern to define a selected indicia. The selected indicia is discontinuous and includes numerous voids between the areas where the first ink layer 48 is located. The first ink layer 48 can be applied to define any type of indicia desired, such as words, symbols or the lattice-type pattern illustrated in FIG. 6. The first ink layer 48 forms a chemical bond with the top surface 32 of the base layer 28 such that the first ink layer 48 remains securely attached to the base layer 48. In the preferred embodiment of the invention, the first ink layer 48 is a water-based ink, such as the Phase 1 ink available from Arcar Graphics, LLC, West Chicago, Ill.

Figure 5:
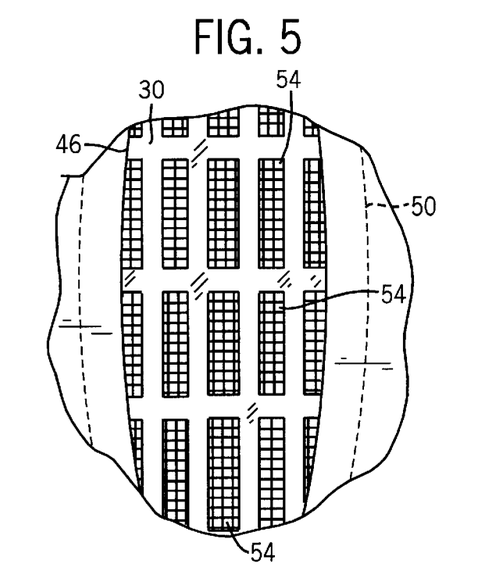
FIG. 5 is an enlarged view taken along line 5—5 of FIG. 2 illustrating the portions of the second ink layer remaining on the resealable label flap after opening.

Once the first ink layer 48 has been applied as a continuous layer over the tamper indicating tab 42, a second ink layer 50 is applied over the entire area that will define the tamper indicating tab 42. As shown in FIGS. 4 and 5, the second ink layer 50 extends slightly beyond the score line 44 defining the tamper indicating tab 42. The second ink layer 50 contacts the top surface 32 of the base layer 28 defining the tamper indicating tab 42 in the areas where the first ink layer 48 is not present, as illustrated by the areas 52 in FIG. 7. The second ink layer 50 chemically bonds to the top surface 32 of the base layer 28 in the areas 52 where the first ink layer 48 is not present.

In addition to contacting the base layer 28 in the areas 52 where the first ink layer 48 is not present, the second ink layer 50 is also applied over the first ink layer 48, as illustrated by the areas indicated by reference numeral 54. Since the second ink layer 50 is applied over the entire first ink layer 48, the second ink layer 50 covers the indicia created by the first ink layer 48 when the label flap 18 is viewed from above, such as in FIG. 1. In the preferred embodiment of the invention, a first ink layer 48 is a light color, such as yellow, while the second ink layer 50 is a dark color, such as black. After the second ink layer 50 is applied, the first ink layer 48 is obscured and thus not visible through the second ink layer 50. Thus, when viewed from above, the area of the label flap 18 including the tamper indicating tab 42 is the solid color of the second ink layer 50.

In accordance with the invention, the first ink layer 48 and the second ink layer 50 are selected such that the second ink layer 50 forms a stronger bond to the adhesive layer 41 of the transparent top layer 30 than to the first ink layer 48. Thus, when the label flap 18 is pulled from the package body 12, the areas 54 of the second ink layer 50 applied over the first ink layer 48 separate from the first ink layer 48 and remain adhered to the top layer 30 of the label flap 18. In addition, the second ink layer 50 is selected such that the areas 52 of the second ink layer 50 printed between the indicia of the first ink layer 48 create a stronger bond to the base layer 28 than the top layer 30, such that the areas 52 remain adhered to the top surface 32 of the tamper indicating tab 42 and separate from the top layer 30. An important design consideration of the label flap 18 of the present invention is the provision of a first ink layer 48 and a second ink layer 50 that do not bond to each other such that the ink layers separate when the label flap 18 is removed from the product package 10.

In the preferred embodiment of the invention, the second ink layer 50 is an ultraviolet curable ink, such as the commercial product Ultrafuse available from Akzo-Nobel, Inc. of Plymouth, Minn. As previously discussed, the second ink layer 50 and the first ink layer 48 do not bond to each other, such that the areas 54 of the second ink layer 50 printed on top of the first ink layer 48 can be separated from the first ink layer 48 after printing.

Referring now to FIG. 8, when the label flap 18 is pulled from the top surface 40 of the package body 12 for the first time, the adhesive bond between the first adhesive 26 on the tamper indicating tab 42 and the top surface 40 of the package body 12 causes the tamper indicating tab 42 to separate along the score line 44 and remain in contact with the top surface 40. As the tamper indicating tab 42 separates from the remaining portions of the base layer 28, the first ink layer 48 remains adhered to the top surface 32 of the tamper indicating tab 42. Additionally, the areas 52 of the second ink layer 50 that are printed directly onto the base layer 28 in the open areas of the first ink layer 48 also adhere to the top surface 32 of the tamper indicating tab 42 such that the combination of the first ink layer 48 and the areas 52 of the second ink layer define the indicia contained on the top surface 32 of the tamper indicating tab 42, as illustrated in FIGS. 2 and 6.

As the tamper indicating tab 42 separates from the label flap 18, the areas 54 of the second ink layer 50 that are applied over the first ink layer 48 remain in contact with the top layer 30 and are pulled off of the tamper indicating tab 42. Thus, the areas 54 of the second ink layer 50 remain on the label flap 18 and define the negative image of the indicia and are contained on the bottom surface of the transparent top layer 30 in the void 46 left by the tearing of the tamper indicating tab 42 from the label flap 18.

As can be seen in FIGS. 5 and 6, the areas 54 that remain on the transparent top layer 30 correspond directly to the positive image of the indicia created by the first ink layer 48 shown in FIG. 6. As illustrated in FIG. 6, the areas 52 of the second ink layer 50 printed between the indicia defined by the first ink layer 48 remain adhered to the tamper indicating tab 42 such that the entire top surface of the tamper indicating tab 42 is covered by ink from the combination of the first ink layer 48 and the second ink layer 50. As previously discussed, the first ink layer 48 is printed in a light color, such as yellow, while the second ink layer 50, including the areas 52, printed in a dark color, such as black.

The formation of the label flap 18 of the present invention will now be described. Initially, the base layer 28 including the first adhesive 26 and a resealable liner (not shown) is unwound from a supply source. In the preferred embodiment of the invention, the base layer 28 including the first adhesive 26 is separated from the releasable liner and the masking layer 27 is applied to the first adhesive 26 at a location corresponding to the starting tab 22. The masking layer 27 renders the first adhesive 26 ineffective and is applied to the entire starting tab 22 except for the location that will correspond to the tamper indicating tab 42, such that the first adhesive 26 contained on the back surface of the tamper indicating tab 42 retains its adhesive properties. With the starting tab 22 formed, the releasable liner is again reapplied to the base layer 28 including the first adhesive 26.

After the starting tab 22 has been formed, the first ink layer 48 is applied to the top surface 32 of the tamper indicating tab 42. The first ink layer 48 is applied such that the first ink layer 48 creates an indicia or pattern on the tamper indicating tab 42. As previously discussed, the first ink layer 48 is applied such that open spaces exist and portions of the top surface 32 of the tamper indicating tab 42 remain visible.

Once the first ink layer 48 has been imprinted, the second ink layer 50 is printed over the entire tamper indicating tab 42. Preferably, the second ink layer 50 is applied such that the second ink layer 50 extends slightly past the edges of the tamper indicating tab 42 defined by the perforations 44. Preferably, the second ink layer 50 is a different, darker color than the color of the first ink layer 48, such that the first ink layer is not visible through the second ink layer 50.

Once the second ink layer 52 dries, the score line 44 is die cut into the base layer 28 to define the tamper indicating tab 42. The score line 44 weakens the strength of the base layer 28 such that the tamper indicating tab 42 can separate from the label flap 18 in the manner previously discussed.

After the tamper indicating tab 42 has been defined by the score line 44, the transparent top layer 30 is applied over the entire label flap 18, including over the second ink layer 50. Once the top layer 30 has been applied to the entire label flap 18, the edges of the label flap 18 are die cut to form the final shape of the label flap 18.

Referring now to FIG. 1, after the package body 12 has been formed and filled with removable articles, the label flap 18 of the present invention is applied to the top surface 40 of the package body 12 as illustrated. When the label flap 18 is initially applied, the tamper indicating tab 42 is connected to the starting tab 22 along the die cut score line 44. As can be seen in FIG. 3, when the label flap 18 is applied to the top surface of the package body 12, the starting tab 22 extends past the opening 16 to the package body 12. When initially applied to the product package 10, the tamper indicating tab 42 is the solid color of the second ink layer 50.

If a user desires to access the cleansing cloths 14 contained within the package body 12, the user first grasps the starting tab 22. As previously discussed, the starting tab 22 is either devoid of the first adhesive 26 or includes a masking layer to neutralize the first adhesive 26 such that the starting tab 22 does not adhere to the top surface 40 of the package body 12. Although the starting tab 22 does not include the active first adhesive 26, the tamper indicating tab 42 does include the first adhesive 26, such that the tamper indicating tab 42 is adhesively attached to the top surface 40 of the package body 12.

Once the starting tab 22 has been grasped, the user pulls back on the label flap 18 as indicated by arrow 56 in FIGS. 2 and 8. As the user pulls back on the starting tab 22, the adhesive bond created by the first adhesive 26 on the back surface of the tamper indicating tab 42 causes the tamper indicating tab 42 to separate from the starting tab 22 along the score line 44 and remain attached to the top surface 40 of the package body 12. As can be seen in FIG. 2, the tamper indicating tab 42 separates from the starting tab prior to the label flap 18 uncovering the opening 16 contained in the package body 12.

As the tamper indicating tab 42 separates from the starting tab 22, the first ink layer 48 remains bonded to the top surface 32 of the tamper indicating tab 42. Additionally, the areas 52 of the second ink layer 50 contacting the top surface 32 of the tamper indicating tab 42 also remain bonded to the tamper indicating tab 42. The combination of the first ink layer 48 and the areas 52 of the second ink layer 50 define the indicia or pattern on the top surface 32 of the tamper indicating tab 42, as illustrated in FIGS. 2 and 6.

As the tamper indicating tab 42 separates, the areas 54 of the second ink layer 50 imprinted on top of the first ink layer 48 separate from the first ink layer 48 and remain bonded to the top layer 30 of the label flap 18. The areas 54 of the second ink layer 50 define a negative image of the indicia or pattern imprinted on the tamper indicating tab 42, as best illustrated in FIGS. 2 and 5. The separation of the areas 54 of the second ink layer 50 from the tamper indicating tab 42 results from the very weak or non-existent bond between the first ink layer 48 and the second ink layer 50 as compared to the stronger bond between the second ink layer 50 and the top layer 30 of the label flap 18.

Once the starting tab 22 has been grasped and the tamper indicating tab 22 separated, the user continues to pull back on the label flap 18 to overcome the removable adhesive bond between the removable first adhesive 26 and the package body 12. The user continues to pull back on the label flap 18 until the entire main body portion 20 has been pulled out of contact from the package body 12.

As shown in FIG. 2, the first time the label flap 18 is pulled from the package body 12, a die cut oval covering 60 separates from the package body 12 to define the opening 16. The oval covering 60 remains adhesively attached to the label flap 18 and prevents contact between the first adhesive 26 and the cleaning cloths 14.

After the desired number of cleaning cloths 14 have been removed from the opening 16, the user repositions the label flap 18 over the opening 16. The first adhesive 26 contained on the main body portion 20 reseals the label flap 18 onto the package body to form the required air-tight seal around the opening 16.

In accordance with the invention, however, the tamper indicating tab 42 is permanently separated from the remaining portion of the label flap 18 after the product package 10 has been opened for the first time. Thus, the separation of the tamper indicating tab 42 indicates that the product package 10 has been previously opened. In addition, when the label flap 18 is reapplied to the package body 12, the negative image of the indicia or pattern defined by the areas 54 of the second ink layer 50 contained on the top layer 30 will not accurately align with the positive image of the indicia or pattern contained on the top surface 32 of the tamper indicating tab 42. Thus, the misaligned indicia or pattern indicates to the user that the label flap 18 has been previously opened.

In the preferred embodiment of the invention, the tamper indicating tab 42 is formed as part of the starting tab 22. In this manner, the tamper indicating tab 42 is separated from the starting tab 22 prior to the user accessing the contents of the product package 10. Therefore, it would be nearly impossible to partially remove the label flap 18 to gain access to the removable articles without separating the tamper indicating tab 22 from the label flap 18.

Figure 9:
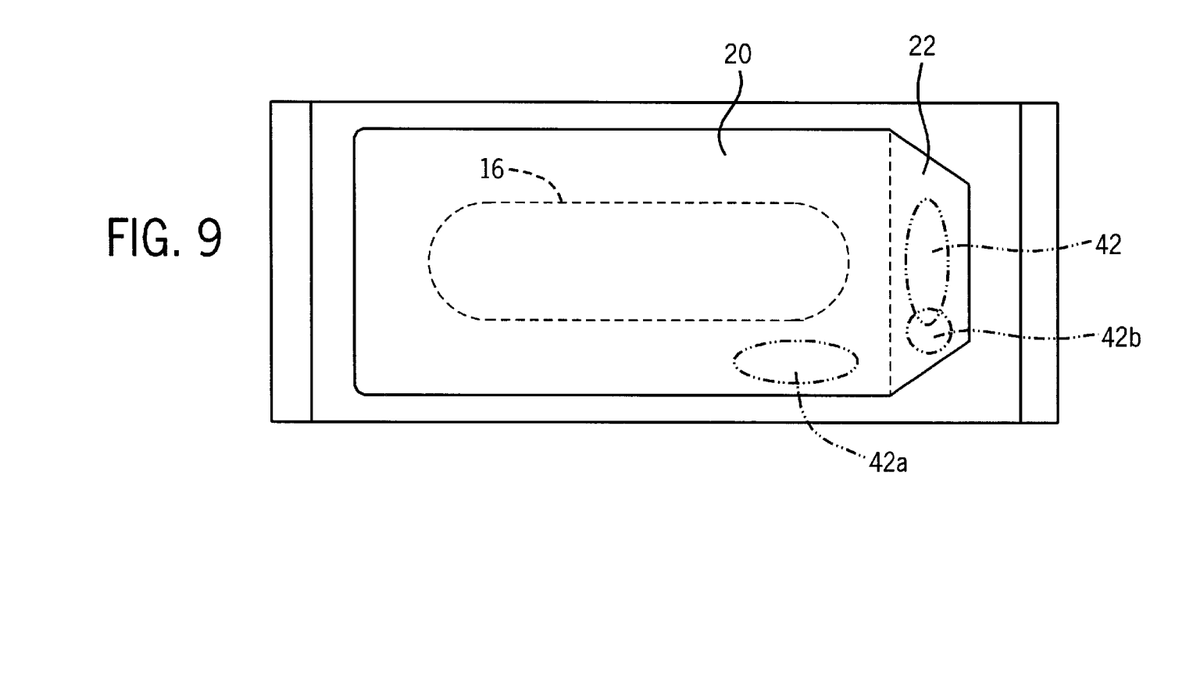
FIG. 9 is a top view of the package including the tamper evident resealable label flap, further illustrating alternate positions for the tamper indicating tab on the label flap.

Referring now to FIG. 9, thereshown are alternate placements for the tamper indicating tab 42. Specifically, the tamper indicating tab 42a is shown positioned along a portion of the main body 20 adjacent to the opening 16. A second alternate embodiment is a smaller, circular tamper indicating tab 42b positioned in the starting tab 22. In each of the alternate embodiments of the tamper indicating tab 42, the tamper indicating tab 42 is defined by a series of perforations formed in the base layer 28.

Although the present invention has been defined as including a specific first ink layer 48 and a specific second ink layer 50, it should be understood that a critical feature of the invention is that the first and second ink layers create a weak or non-existent bond to each other such that the first ink layer 48 and the second ink layer 50 separate as the tamper indicating tab 42 separates from the remaining portions of the label flap 18. Additionally, it is an important feature of the invention that the second ink layer 50 form a stronger bond to the top layer 30 than its bond to the first ink layer 48 such that the second ink layer 50 remains in contact with the top layer 30 as the tamper indicating tab 42 separates.

Various alternatives and embodiments are contemplated as being within the scope of the following claims particularly pointing out and distinctly claiming the subject matter regarded as the invention.

We claim:

1. A tamper evident label flap positionable to cover an opening in a package containing removable articles, the label flap comprising:
    a base layer sized to cover the opening in the package, the base layer having a top surface and a bottom surface, the bottom surface including a first adhesive to permit removal and application of the label flap to the package;
    a tamper indicating tab formed in the base layer, the tamper indicating tab being defined by a weakened portion of the base layer, the tamper indicating tab including the first adhesive on its bottom surface;
    a discontinuous first ink layer applied to the top surface of the tamper indicating tab to define an indicia;
    a second ink layer applied over the entire tamper indicating tab including the first ink layer, the second ink layer contacting the top surface of the tamper indicating tab in areas not covered by the first ink layer, wherein the second ink layer extends past the weakened portion of the base layer defining the tamper indicating tab; and
    a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer,
    wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

2. A tamper evident label flap positionable to cover an opening in a package containing removable articles, the label flap comprising:
    a base layer sized to cover the opening in the package, the base layer having a top surface and a bottom surface, the bottom surface including a first adhesive to permit removal and application of the label flap to the package;
    a tamper indicating tab formed in the base layer, the tamper indicating tab being defined by a weakened portion of the base layer, the tamper indicating tab including the first adhesive on its bottom surface;
    a discontinuous first ink layer applied to the top surface of the tamper indicating tab to define an indicia;
    a second ink layer applied over the entire tamper indicating tab including the first ink layer, the second ink layer contacting the top surface of the tamper indicating tab in areas not covered by the first ink layer, wherein the indicia defined by the first ink layer is not visible through the second ink layer prior to the label flap being pulled from the package; and
    a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer,
    wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

3. The label flap of claim 2 wherein the first ink layer and the second ink layer are different colors.

4. The label flap of claim 2 wherein the first adhesive contained on the back surface of the tamper indicating tab forms an adhesive bond with the package that is stronger than the weakened portion of the base layer defining the tamper indicating tab, such that the tamper indicating tab separates along the weakened portion of the base layer when the label flap is removed from the package.

5. The label flap of claim 2 wherein the base layer further includes a starting tab devoid of the first adhesive.

6. The label flap of claim 5 wherein the tamper indicating tab is formed in the starting tab.

7. A tamper evident label flap positionable to cover an opening in a package containing removable articles, the label flap comprising:
    a base layer sized to cover the opening in the package, the base layer having a top surface and a bottom surface, the bottom surface including a first adhesive to permit removal and application of the label flap to the package;
    a tamper indicating tab formed in the base layer, the tamper indicating tab being defined by a weakened portion of the base layer, the tamper indicating tab including the first adhesive on its bottom surface;
    a discontinuous first ink layer applied to the top surface of the tamper indicating tab to define an indicia, wherein the first ink layer is formed from a water-based ink;
    a second ink layer applied over the entire tamper indicating tab including the first ink layer, the second ink layer contacting the top surface of the tamper indicating tab in areas not covered by the first ink layer, wherein the second ink layer is formed from an ultraviolet curable ink; and
    a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer,
    wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

8. A resealable package comprising:
    a flexible package body having an internal space sized to contain a plurality of removable articles;

an elongated opening through the package body to the internal space for accessing the removable articles;

a resealable flap positioned on the flexible package to cover the opening in the package, the label flap comprising:

a base layer sized to cover the opening in the package, the base layer having a top surface and a bottom surface, the bottom surface including a first adhesive to permit removal and application of the label flap to the package;

a tamper indicating tab formed in the base layer, the tamper indicating tab being defined by a weakened portion of the base layer, the tamper indicating tab including the first adhesive on its bottom surface;

a discontinuous first ink layer applied to the top surface of the tamper indicating tab to define an indicia;

a second ink layer applied over the entire tamper indicating tab including the first ink layer, the second ink layer contacting the top surface of the tamper indicating tab in areas not covered by the first ink layer wherein the second ink layer extends past the weakened portion of the base layer defining the tamper indicating tab; and a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer, wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

9. A resealable package comprising:

a flexible package body having an internal space sized to contain a plurality of removable articles;

an elongated opening through the package body to the internal space for accessing the removable articles;

a resealable flap positioned on the flexible package to cover the opening in the package, the label flap comprising:

a base layer sized to cover the opening in the package, the base layer having a top surface and a bottom surface, the bottom surface including a first adhesive to permit removal and application of the label flap to the package;

a tamper indicating tab formed in the base layer, the tamper indicating tab being defined by a weakened portion of the base layer, the tamper indicating tab including the first adhesive on its bottom surface;

a discontinuous first ink layer applied to the top surface of the tamper indicating tab to define an indicia;

a second ink layer applied over the entire tamper indicating tab including the first ink layer, the second ink layer contacting the top surface of the tamper indicating tab in areas not covered by the first ink layer, wherein the indicia defined by the first ink layer is not visible through the second ink layer prior to the label flap being pulled from the package; and a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer, wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

10. The package of claim 9 wherein the first ink layer and the second ink layer are different colors.

11. The package of claim 9 wherein the first adhesive contained on the back surface of the tamper indicating tab forms an adhesive bond with the package that is stronger than the weakened portion of the base layer defining the tamper indicating tab, such that the tamper indicating tab separates from the base layer along the weakened portion when the label flap is removed from the package.

12. The package of claim 9 wherein the base layer further includes a starting tab spaced from the opening in the package when the label flap is applied to the package, the starting tab being devoid of the first adhesive.

13. The package of claim 12 wherein the tamper indicating tab is formed in the starting tab such that the tamper indicating tab separates from the label flap prior to the label flap uncovering the opening in the package.

14. A resealable package comprising:

a flexible package body having an internal space sized to contain a plurality of removable articles;

an elongated opening through the package body to the internal space for accessing the removable articles;

a resealable flap positioned on the flexible package to cover the opening in the package, the label flap comprising:

a base layer sized to cover the opening in the package, the base layer having a top surface and a bottom surface, the bottom surface including a first adhesive to permit removal and application of the label flap to the package;

a tamper indicating tab formed in the base layer, the tamper indicating tab being defined by a weakened portion of the base layer, the tamper indicating tab including the first adhesive on its bottom surface;

a discontinuous first ink layer applied to the top surface of the tamper indicating tab to define an indicia; wherein the first ink layer is formed from a water-based ink;

a second ink layer applied over the entire tamper indicating tab including the first ink layer, the second ink layer contacting the top surface of the tamper indicating tab in areas not covered by the first ink layer, wherein the second ink layer is formed from an ultraviolet, curable ink; and a transparent top layer adhesively attached to the entire base layer including the second ink layer applied over the tamper indicating tab, the second ink layer forming a substantially stronger bond to the top layer than the first ink layer and the second ink layer forming a stronger bond to the base layer than the top layer, wherein when the label flap is pulled from the package, the tamper indicating tab separates from the base layer and remains in contact with the package and the areas of the second ink layer applied over the first ink layer separate from the first ink layer and remain in contact with the transparent top layer such that the indicia defined by the first ink layer is visible on the tamper indicating tab.

15. The package of claim 9 wherein the weakened portions of the base layer defining the tamper indicating tab are die cut into the base layer.

\* \* \* \* \*